Patented Oct. 20, 1953

2,656,299

UNITED STATES PATENT OFFICE 2,656,299

PENICILLIN COMPOSITIONS

William Elias, West Goshen Township, Chester County, and Howard Joseph Merrion, Malvern, Pa., assignors, by mesne assignments, to American Home Products Corporation, New York, N. Y., a corporation of Delaware No Drawing. Application June 30, 1948, Serial No. 36,294

7 Claims. (Cl. 167—58)

This invention relates to antibiotic compositions and more particularly relates to an injectible antibiotic composition.

In order to maintain prolonged blood levels of penicillin which is considered to be necessary for proper therapeutic effect in many cases, the earliest practice involved injecting penicillin periodically at relatively short intervals of about three to four hours over a period of at least 24 hours. In order to overcome the obvious disadvantages of repeated injections, it was found that prolonged blood levels could be maintained with a single injection of a penicillin, oil-and-wax composition about once in every 24 hours, on the average.

The penicillin composition with oil-and-wax proved highly successful but it also possessed serious disadvantages. It was found that unassimilated lumps remained after repeated injections which at times yielded only to surgical excision. It was also found that the injection often caused pain and, in addition, there were occasional allergenic reactions. A disadvantage to the physician or the person administering this composition was that a bone-dry syringe was required because any moisture caused clumping and blocking of the needle. The major problem confronting the art, therefore, has been to find a composition which was as effective as penicillin in oil-and-wax but which would be free of the disadvantages inherent in the oil-and-wax composition.

The problem was in part solved by the use of a salt of penicillin and procaine. It was found that the addition of procaine hydrochloride in aqueous solution to a crystalline penicillin salt aqueous solution, resulted in the formation of a substantially water-insoluble salt which was visualized as being useful for the slow release of penicillin when injected parenterally. In order to utilize the salt so that it could be injected parenterally, a dispersing or suspension agent was necessary and, in spite of its known disadvantages, the only vehicle considered suitable by the art was a vegetable oil such as peanut or sesame seed oil. While this salt of penicillin in the oil vehicle did away with the incidences of unassimilated lumps of wax and a great deal of the pain which accompanied the injection of the older composition, it still retained those disadvantages inherent in the use of an oil vehicle. Thus, there was still a certain amount of pain on injection arising from the use of oil and the known disadvantage of allergenic reactions to oil. In addition, the administration of procaine-penicillin in oil requires a substantially bone-dry syringe to avoid clumping.

Bearing in mind the disadvantages of an oily or greasy vehicle, a composition was then sought which would avoid at least the major disadvantages of the oleaginous vehicles.

It was conceived that a most desirable product would be a dry penicillin composition wherein the penicillin salt wald be suspended or dispersed prior to use merely by reconstituting with distilled water, a normal saline or a dextrose solution. The advantage of a dry composition lies in the fact that the penicillin would remain therapeutically effective over a substantial period of time. A dry composition, for example, is effective for at least 12 months which is an important advantage.

It was found that a highly successful dry composition could be obtained by the use of specific hydrophilic substances as suspending agents for the penicillin salt. It should be pointed out that not all hydrophilic agents are satisfactory. The material must be such that it can be mixed and held in a substantially dry state until ready for use. It should be non-toxic, readily soluble in water at room temperature and it should be substantially inert and pyrogen-free. It should be easily sterilized without change in composition. Moreover it should be capable of being brought to a suitable particle size. An important characteristic is that it should form an effective suspending agent for the penicillin salt on the addition of water within a substantially instantaneous period of time at room temperature.

As an example of a suitable hydrophilic agent meeting the above-mentioned qualifications, it was found that an alkaline salt of carboxymethyl cellulose makes an excellent suspending or dispersing agent for insoluble salts of penicillin. By its use, all the disadvantages of oily suspensions are avoided without the loss of any of the more important advantages of the older compositions. This material is non-toxic, inert and capable of being sterilized without change in composition. On the addition of water it forms a somewhat viscous solution in a very short period of time.

An alkaline salt of carboxymethyl cellulose, found to be highly effective as a suspending agent, has been assigned the formula $ROCH_2COONa$ where R represents the cellulose structure. This material as prepared in commerce is a substantially colorless, fibrous material and is available in three viscosity types, a low viscosity type of which a 2% concentration at 25° C. has a viscosity range of about 25 to 50 centipoises; a medium viscosity type testing about 400 to 600 centipoises and a high viscosity type of which a 1% concentration at 25° C. has a viscosity of approximately 2,000 centipoises. Any one of these three types can be used although the higher viscosity types are preferred.

The use of a composition containing a hydrophilic suspending agent having the above stated characteristics, provides the sparingly soluble penicillin salts in a smooth, homogeneous suspension in water which can be easily aspirated from a container for administration. By the use of water in place of an oil vehicle, the dangers of oil embolism and allergenic reactions are avoided; there is little or no pain at the site of injection; and the annoyance of carefully drying the syringe to avoid clumping and plugged needles is obviated. Moreover, the new composition is therapeutically highly effective since a single injection of 1 cubic centimeter containing 300,000 units, for example, has been found to maintain an effective 24 hour blood level in nearly all cases.

The composition is prepared by mixing the penicillin salt with the carboxymethyl cellulose salt and pulverizing the mixture to the desired particle size. The selected size of the majority of the particles should be such that they are neither so coarse as to block the needle nor so fine as to clog the syringe. It has been found that a proper size is achieved when the majority of the particles fall within the range of about 5 to about 250 microns.

In the preparation of this new product one mixes a dry sparingly soluble penicillin salt with about 0.5 to about 2.5% by weight of dry, sterile, hydrophilic suspending agent in order to obtain, when reconstituted with water, about 0.25 to about 1.0% by weight of hydrophilic suspending agent per unit volume of the entire reconstituted material. This composition is preferably made up for sale in dry, particle form although it can obviously be prepared in a water solution if desired. In the dry form the product is quite stable and can be kept for a relatively long period of time. To use the dry composition one merely adds an indicated amount of sterile water, sterile normal saline solution (U. S. P.) or U. S. P. dextrose and agitates the mixture.

The following specific example for the preparation of one composition falling within the scope of this invention involves the use of procaine penicillin as the sparingly soluble penicillin salt. This salt may be made up in the following manner:

*Example*

50 grams of potassium penicillin is dissolved in 275 ml. water and 100 ml. ethanol. The solution is sterilized by filtering through a bacterial filter. A 30% aqueous solution of procaine hydrochloride is prepared and sterilized by passing through a bacterial filter. To the solution of penicillin is added with stirring 125 ml. of the 30% procaine hydrochloride solution. The mixture is cooled to 0° C. and the crystals that are formed are filtered. The crystals are washed with ether and dried in vacuo under aseptic conditions.

The sparingly soluble penicillin salt, obtained as illustrated above, is thoroughly mixed with a small amount of sodium carboxymethyl cellulose and the mixture is pulverized to the desired consistency. Specifically, in the case of procaine penicillin, it is mixed with 1.1% by weight of dry, sterile, sodium carboxymethyl cellulose and passed through a pulverizer to obtain a desirable particle size. The resulting mixture contains 22 mg. of carboxymethyl cellulose per 2 grams of procaine penicillin in each vial. On the addition of 5 cc. of sterile water, each ml. contains 4 mg. of carboxymethyl cellulose or 0.4% by weight.

It is of course obvious that one is not bound to the use of procaine penicillin in the composition as the sparingly soluble salts. Bases other than those mentioned may be used for preparing sparingly soluble penicillin salts providing they are non-toxic in the amounts used. As examples of bases that will form sparingly soluble penicillin salts may be mentioned the various para-aminobenzoates and para-nitrobenzoates acting similarly to procaine and related thereto, as for example the alkyl p-aminobenzoates such as ethyl p-aminobenzoate, n-butyl-p-aminobenzoate and the aminoalkyl-p-aminobenzoates such as 2-isobutylamino ethyl-p-aminobenzoate, 3-di-n-butyl-amino-propyl-p-aminobenzoate, 2-dimethylamino-ethyl-p-butylaminobenzoate and other similarly related compounds. Various other sparingly soluble penicillin salts may be used such as salts of penicillin with certain metals and dyes as disclosed in the October 17, 1947 issue of "Science" on p. 370 and salts formed with suitable organic bases.

We claim:

1. A dry antibiotic composition comprising, a sparingly water-soluble salt of penicillin and a dry, non-toxic, alkaline salt of carboxymethyl cellulose, sterilizable without decomposition and which is readily soluble in relatively cold water, said composition being characterized by substantially immediately forming a suspension of penicillin particles at room temperature by the addition of an aqueous medium.

2. A dry antibiotic composition comprising a substantially water-insoluble salt of penicillin and sodium carboxymethyl cellulose as a suspending agent both components being present in dry admixture.

3. A dry antibiotic composition comprising a sparingly water-soluble salt of penicillin and about 0.5 to about 2.5% by weight of a dry, non-toxic, alkali metal salt of carboxymethyl cellulose which is sterilizable without decomposition and readily soluble in relatively cold water, said composition being characterized by its ability to form a relatively viscous suspension of penicillin particles at room temperature by the addition of an aqueous medium.

4. A therapeutic composition comprising a dry admixture of procaine penicillin and sodium carboxymethyl cellulose.

5. A therapeutic composition comprising a sparingly water-soluble salt of penicillin suspended in an aqueous vehicle, containing a non-toxic alkaline salt of carboxymethyl cellulose as a suspending agent.

6. A therapeutic composition comprising procaine penicillin suspended in an aqueous vehicle, containing sodium carboxymethyl cellulose as a suspending agent.

7. A dry antibiotic composition comprising, a sparingly water-soluble salt of penicillin and a dry, non-toxic, sterilizable synthetic gum hydrophilic suspending agent of small particle size, the majority of the particles ranging from about 5 to about 250 microns.

WILLIAM ELIAS.
HOWARD JOSEPH MERRION.

References Cited in the file of this patent

UNITED STATES PATENTS

| Number | Name | Date |
|---|---|---|
| 2,039,940 | Steinberg | May 5, 1936 |
| 2,166,074 | Reichel | July 11, 1939 |

FOREIGN PATENTS

| Number | Country | Date |
|---|---|---|
| 515,566 | Great Britain | Dec. 8, 1939 |

OTHER REFERENCES

Drug and Cosmetic Industry, November 1947, page 595.

Drug and Cosmetic Industry, May 1946, page 697.

Proc. Staff Meetings Mayo Clinic, December 10, 1947, pages 567 to 570.

Science, February 13, 1948, pages 169 and 170.